US012777452B2

(12) United States Patent
Ayetra et al.

(10) Patent No.: US 12,777,452 B2
(45) Date of Patent: Oct. 27, 2026

(54) LOCATION REQUEST MANAGEMENT USING FRESHNESS METRICS

(71) Applicant: T-Mobile USA, Inc., Bellevue, WA (US)

(72) Inventors: Bipin Ayetra, Bellevue, WA (US); Tyler Gothmann, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 266 days.

(21) Appl. No.: 18/776,736

(22) Filed: Jul. 18, 2024

(65) Prior Publication Data

US 2026/0025781 A1 Jan. 22, 2026

(51) Int. Cl.
*H04W 64/00* (2009.01)
*H04L 43/02* (2022.01)

(52) U.S. Cl.
CPC ............. *H04W 64/00* (2013.01); *H04L 43/02* (2013.01)

(58) Field of Classification Search
None
See application file for complete search history.

(56) References Cited

U.S. PATENT DOCUMENTS

| | | | |
|---|---|---|---|
| 6,317,604 | B1 | 11/2001 | Kovach et al. |
| 6,873,290 | B2 | 3/2005 | Anderson et al. |
| 7,274,332 | B1 | 9/2007 | Dupray |
| 7,486,943 | B2 | 2/2009 | Choti et al. |
| 7,536,695 | B2 | 5/2009 | Alam et al. |
| 8,045,995 | B2 | 10/2011 | King et al. |
| 8,260,553 | B2 | 9/2012 | Klein et al. |
| 8,391,896 | B2 | 3/2013 | Curcio et al. |
| 8,467,809 | B2 | 6/2013 | Lee et al. |
| 9,560,489 | B2 | 1/2017 | Marti et al. |
| 9,609,469 | B2 | 3/2017 | Khorashadi et al. |
| 9,615,202 | B2 | 4/2017 | Dal Santo et al. |
| 9,691,091 | B2 | 6/2017 | Jones et al. |
| 9,781,259 | B1 | 10/2017 | Kodaypak |

(Continued)

FOREIGN PATENT DOCUMENTS

| | | | |
|---|---|---|---|
| CN | 103608780 | A | 2/2014 |
| CN | 102884849 | B | 10/2016 |

(Continued)

*Primary Examiner* — Suhail Khan

(74) *Attorney, Agent, or Firm* — Ashurst Perkins Coie US LLP

(57) ABSTRACT

The present technology relates to location request management using freshness metrics. A request manager is disclosed that manages location requests at a computing device. The request manager receives an updateable location freshness configuration specifying a location freshness metric for each of one or more location estimation requesters. Upon receiving a location estimation request from a requester, the request manager requests a prior location estimate from a location API. The location API returns the prior location estimate and the amount of time elapsed since it was determined to the request manager. The request manager determines if the elapsed time satisfies the freshness metric. If so, the request manager satisfies the location request with the prior location estimate. If not, the request manager retrieves a current location estimate from the API and satisfies the location request with the current location estimate.

20 Claims, 5 Drawing Sheets

(56) References Cited

U.S. PATENT DOCUMENTS

| | | | | |
|---|---|---|---|---|
| 9,820,108 | B1 | 11/2017 | Inciong et al. | |
| 9,823,083 | B2 | 11/2017 | Weksler et al. | |
| 9,826,349 | B1 | 11/2017 | Yang et al. | |
| 9,838,838 | B2 | 12/2017 | Rhee et al. | |
| 9,949,088 | B1 | 4/2018 | Davies et al. | |
| 10,467,561 | B2 | 11/2019 | Haparnas et al. | |
| 10,939,486 | B2 | 3/2021 | Jensen et al. | |
| 11,109,194 | B1 | 8/2021 | Pinheiro et al. | |
| 11,508,010 | B2 | 11/2022 | Choi et al. | |
| 11,734,642 | B2 | 8/2023 | Smith et al. | |
| 2006/0099960 | A1 | 5/2006 | Duan | |
| 2007/0167173 | A1 | 7/2007 | Halcrow et al. | |
| 2011/0320119 | A1 | 12/2011 | Jerez et al. | |
| 2014/0057656 | A1* | 2/2014 | Hasegawa ............... | G01S 19/48<br>455/456.2 |
| 2017/0307694 | A1 | 10/2017 | Matsumura et al. | |
| 2020/0294398 | A1 | 9/2020 | Naka | |
| 2024/0187817 | A1 | 6/2024 | Loe et al. | |

FOREIGN PATENT DOCUMENTS

| | | | |
|---|---|---|---|
| CN | 114071706 | B | 4/2022 |
| DE | 202013000060 | U1 | 2/2013 |
| DE | 202012013375 | U1 | 8/2016 |
| DE | 102012221413 | B4 | 9/2019 |
| EP | 3321867 | A1 | 5/2018 |
| KR | 101094616 | B1 | 12/2011 |
| KR | 102271797 | B1 | 7/2021 |
| KR | 102295149 | B1 | 8/2021 |
| WO | 02078378 | A1 | 10/2002 |
| WO | 2015184184 | A2 | 12/2015 |
| WO | 2016036552 | A1 | 3/2016 |
| WO | 2017106369 | A1 | 6/2017 |

* cited by examiner

LOCATION REQUEST MANAGEMENT USING FRESHNESS METRICS

BACKGROUND

An error reporting application on an electronic device, such as a user equipment (UE), can utilize location determinations to enhance its diagnostic capabilities and provide more context-specific error reports. These applications can use Global Navigation Satellite Systems (GNSS), Wi-Fi, cellular network data, and other hardware, such as gyroscopes and accelerometers, to pinpoint the device's location at the time of the error. This location data can be crucial in diagnosing and resolving issues, especially in cases where the error is related to location-specific factors. For example, if a software application consistently experiences errors in a specific region, it could indicate a compatibility issue with local network infrastructure or regulatory constraints. For instance, a network connectivity issue might be tied to a specific geographical area experiencing service disruptions. Additionally, location data can help in identifying and addressing larger scale issues, such as widespread service disruptions or software bugs affecting users in a particular area. Thus, the integration of location determinations in background error reporting applications can significantly improve the efficiency and effectiveness of troubleshooting and problem resolution processes. In some cases, location determinations can be resource-expensive, thereby slowing device performance or draining the battery. Thus, while useful, device performance can be improved by limiting the amount of location determinations requested by an application.

BRIEF DESCRIPTION OF THE DRAWINGS

Detailed descriptions of implementations of the present invention will be described and explained through the use of the accompanying drawings.

Figure 1:
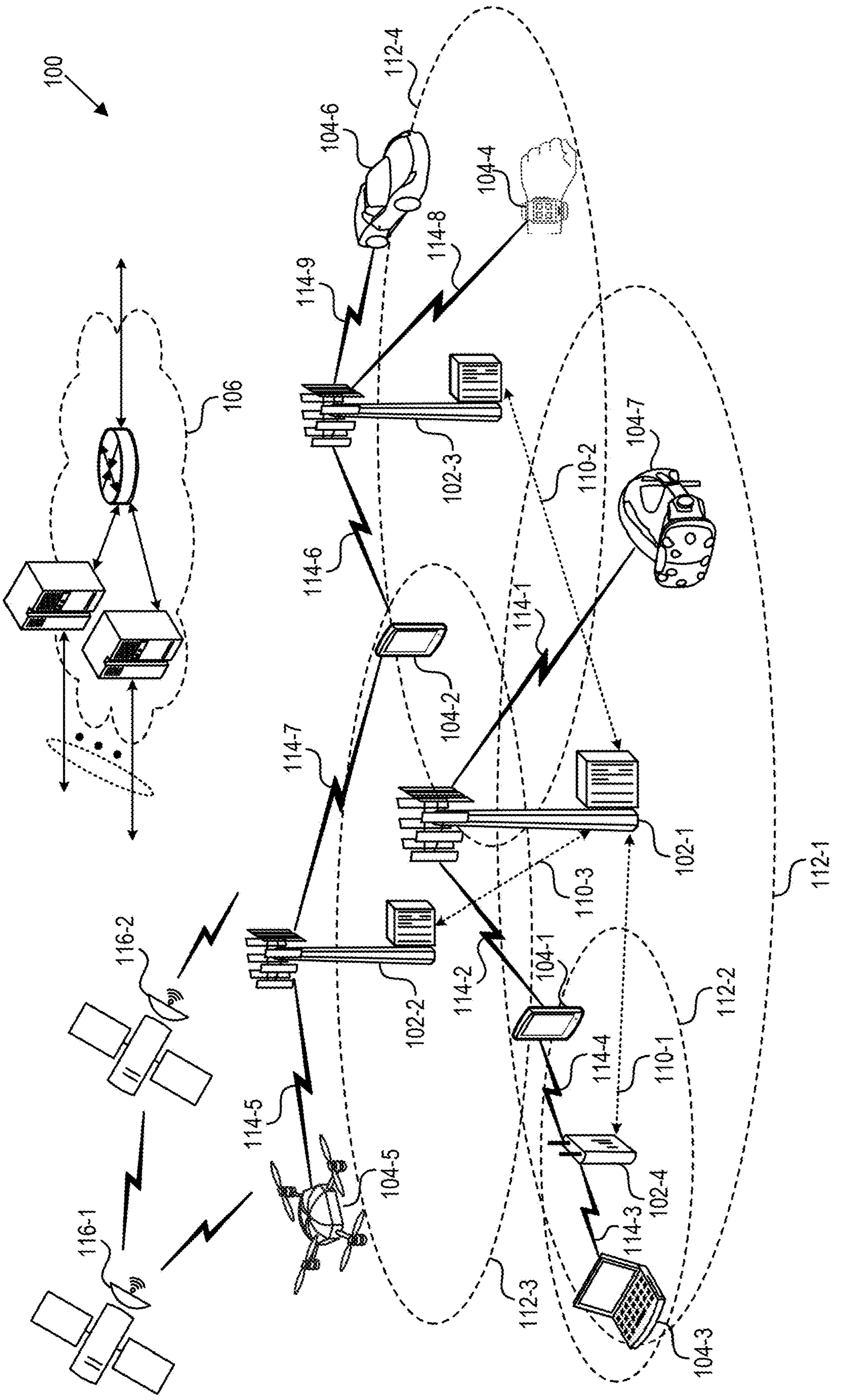
FIG. 1 illustrates a wireless communications network that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Applications on a computing device utilize location services to enhance user experiences by providing functionalities such as real-time navigation, local search, and personalized content. For instance, mapping and navigation apps use location estimates of the computing device to offer route planning and traffic updates, while social media platforms enable geotagging of posts and photos. Fitness apps track outdoor activities and map exercise routes, and e-commerce apps use location data for order tracking and delivery. Accordingly, the various applications on a computing device can require frequent estimates of location of the device.

Many applications receive location estimates by communicating with a location provider that determines an estimate of the location of the device and communicates the estimate to the requesting application. To provide more accurate location estimates, location providers can leverage various location determination systems, such as GNSS, Wi-Fi location systems, cell tower triangulation systems, and hardware systems utilizing gyroscopes, accelerometers, and so on. Communication with the location provider can occur through an application programming interface (API). When an application requests the device's location, the API communicates with the location provider to gather data from one or more of the location determination systems. The location provider processes this data to generate an accurate location estimate, which is then returned to the application through the API.

Location estimation can significantly harm battery life and device performance due to the continuous and intensive use of various hardware components to enable the location determination systems. Additionally, the processing power needed to aggregate and analyze location data from multiple sources can strain the devices processor, leading to increased energy consumption and potential overheating. This constant demand on the device's resources not only reduces battery life but can also slow down other applications and overall device performance, making it crucial to optimize location services and manage their usage efficiently.

Improving the efficiency of location estimation requests to improve device performance is even more important with respect to a wireless service provider's on-device data collection application, which may be required to run in the background of the device without display to the user. The wireless service provider's on-device data collection application can be a comprehensive tool for gathering, analyzing, and reporting a wide array of data related to device performance, network conditions, and user behavior. This application is installed on the user's device and operates in the background, continuously monitoring and collecting data without disrupting the user's activities. Alongside this data, the application can also gather location information that provides valuable context, helping to identify whether certain issues are confined to specific geographical areas. For instance, if users in a particular location consistently experience poor network coverage or low voice call quality, this could indicate a problem with the local network infrastructure. The data can then be communicated to the wireless service provider to improve network services.

One way to reserve device resources is to allow a location provider to respond to location requests with cached location estimates previously provided by the location provider (e.g., to other requesters/applications) rather than initiating a new location estimate. This approach reduces the need for continuous sensor activation and data processing, thereby conserving battery life and enhancing device performance. It is important, however, to ensure that the cached data is sufficiently recent and accurate for the application's requirements, balancing resource efficiency with the need for precise location information.

One way of controlling the preciseness of prior location estimates is to allow prior location estimates to be used in lieu of new location estimates only when the prior location estimate was determined more recently than a maximum allowable delay. The preciseness required for different requesters may vary, however. For example, location estimates requested to accompany network quality data may need to be particularly precise, as network quality is often closely related to location. In contrast, data collected regarding device battery may be less sensitive to inaccuracies in location estimates. Thus, efficiency can be improved by allowing battery data collectors to utilize older location estimates than, say, network quality data collectors.

The request management module disclosed herein provides this efficiency by allowing for different location freshness metrics to be assigned to different requesters using a location freshness configuration. When a particular requester requests a location estimate, the request management module can determine the location freshness metrics associated with the requester and make a location estimation request to the location API interfacing with the location provider. In an attempt to preserve device resources, the request management module can first request a prior location cached in the location provider. If the prior location satisfies the location freshness metrics (e.g., a maximum allowable time elapsed since the prior location estimate was determined) associated with the particular requester, the request management module can return the location estimate to the requester. If the prior location estimate does not satisfy the location freshness metrics associated with the particular requester, however, the request management module can request a new location estimate that requires the location provider to utilize device resources to estimate the device's current location. The current location can then be provided back to the request management module and, in turn, provided back to the requester.

Each time a new location request is required, the request management module can store an indication that the particular requester initiated a new location request. Once collected, this data can be transmitted back to an administrator of the wireless service provider or an administrator associated with the particular requester to be used to tune the location freshness metrics. For example, if a particular requester is initiating large amounts of new location requests, and this level of accuracy is not required for the requester, the location freshness configuration can be tuned (e.g., through wireless updates/reconfigurations) to allow for older location estimates to be provided to the particular requester (e.g., by altering the location freshness metrics associated with the particular requester). In response to subsequent location estimation requests by the particular requester, the request management module can then determine whether to provide the particular requester a prior location estimate or a current location estimate based on the updated location freshness metrics.

The request management module also allows for other types of location estimation requests. For example, in response to location estimation requests from requesters that require more accurate location determinations or are less sensitive to negative impacts on device performance (e.g., devices operating in a testing mode to test wireless services/network coverage or navigational applications), the request management module can request new location estimates of the device's current location before first determining if a prior location request is accurate enough.

Similarly, some applications can require recurring estimates of the device's location, and the request management module can accommodate these requests. For example, the request management module can request recurring location estimates from the location provider, and the location provider can provide estimates of the device's location at various instances over a time interval. The location freshness configuration can similarly provide location freshness metrics to tune these requests to allow for differences in accuracy requirements. For example, the location freshness configuration can specify location freshness metrics, including a minimum difference in distance between location updates or a minimum difference in time between location updates. The request management module can then request the recurring location estimates in accordance with the location freshness metrics so that no two consecutive location estimates violate the location freshness metrics. For example, the location provider can provide a location update estimate to the request management module, which then forwards the location to the requester, each time a prior location estimate and a location update estimate differ by the location freshness metrics (e.g., minimum distance or minimum time).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 Gigahertz (GHz) or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid Automatic Repeat Request (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a UE, a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of the network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a non-terrestrial network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QoS) requirements and multi-terabits-per-second data transmission in the era of 6G and beyond, such as terabit-per-second backhaul systems, ultra-high-definition content streaming among mobile devices, AR/VR systems, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Request Management Module

Figure 2:
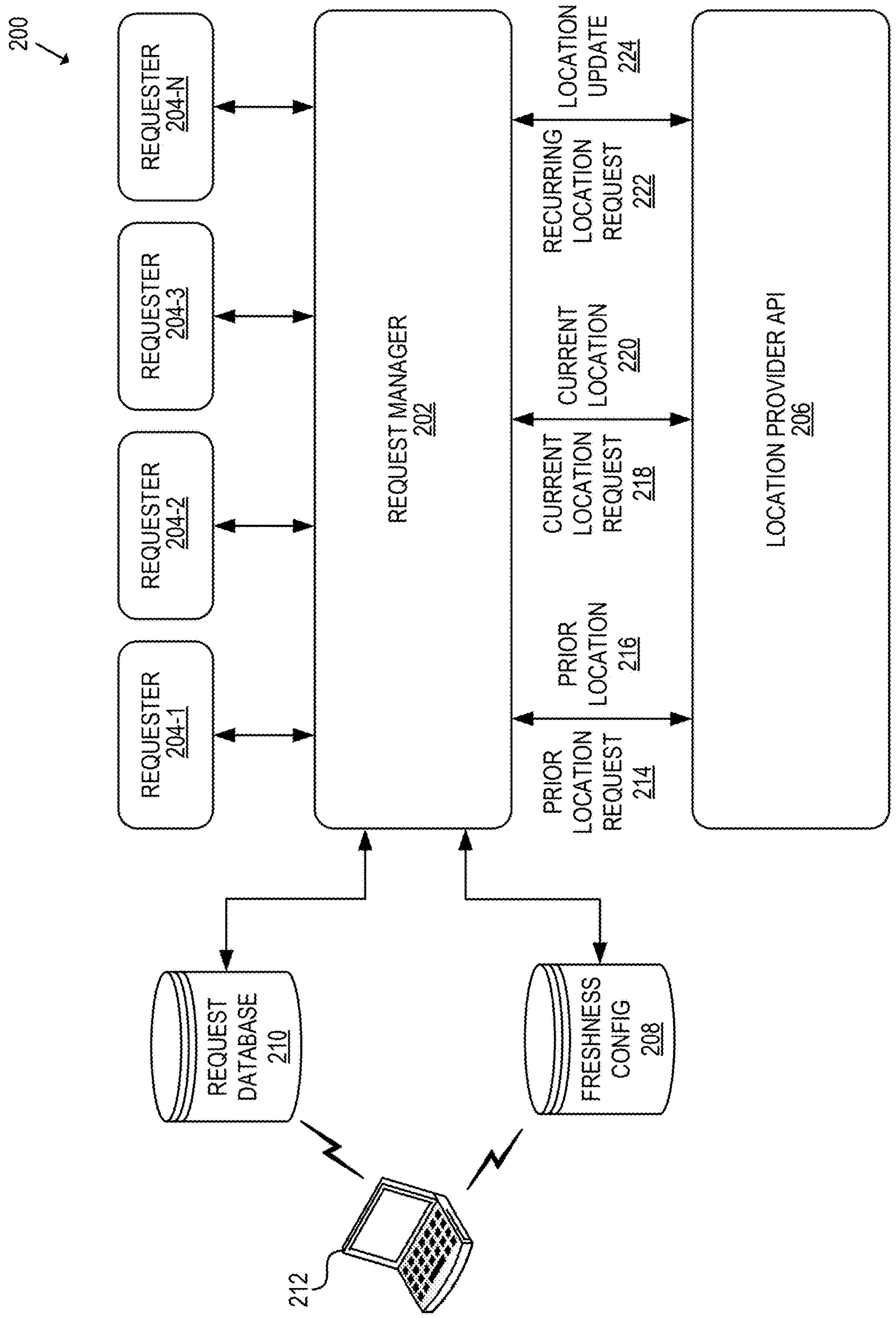
FIG. 2 illustrates a system for implementing location request management using freshness metrics.

FIG. 2 illustrates a system 200 for implementing location request management using freshness metrics. The system 200 includes a request manager 202 configured to optimize location requests from requesters 204 (e.g., requester 204-1, requester 204-2, requester 204-3, requester 204-N) to a location provider API 206. The location provider API 206 can be used to communicate with a location provider that determines location and returns the location estimates. In aspects, the request manager 202 optimizes requests from the requesters 204 based on a location freshness configuration 208 specifying location freshness metrics associated with the requesters 204. For example, the location freshness metrics can specify how recent a location estimate needs to have been determined in order to satisfy a location request from one of the requesters 204.

The requesters 204 can include different applications (or portions thereof) operating on a computing device that require estimations of the device's location to provide certain functionality. For example, the requesters 204 can include mapping and navigation applications, social media applications, search applications, fitness applications, e-commerce and delivery service applications, ride-hailing applications, emergency and safety applications, weather applications, or the like. As a specific example, the requesters can be elements of a wireless service provider's on-device data collection application. The wireless service provider's on-device data collection application can be a comprehensive tool for gathering, analyzing, and reporting a wide array of data related to device performance, network conditions, and user behavior. The different requesters 204 can include different data collection systems that collect different device data in accordance with different data collection events. For example, one of the requesters 204 can collect data related to battery status. Alternatively or additionally, one or more of the requesters 204 can collect data related to user activities, including app launches and media streaming, providing insights into user behavior and app performance. Alternatively or additionally, one or more of the requesters 204 can collect data about the quality of wireless services. This can include metrics like voice call connection quality, network coverage, and data usage. By monitoring these aspects, the application can identify any issues or areas for improvement in the wireless service or optimize the device for the user.

This data collection application can be installed on the user's device and operate in the background, continuously monitoring and collecting data without disrupting the user's activities. Alongside this data, the data collection application can gather location information that provides valuable context, helping to identify whether certain issues are confined to specific geographical areas. For instance, if users in a particular location consistently experience poor network coverage or low voice call quality, this could indicate a problem with the local network infrastructure. By monitoring these aspects, the application can collect data that can be used by the wireless service provider to identify any issues or areas for improvement in the wireless service and deploy solutions.

When location estimates are needed, the requesters 204 can interface with the location provider API 206 to provide these location estimates. The request manager 202 can function as an abstraction layer that simplifies engagement with the location provider API 206. The request manager 202 can reference the location freshness configuration 208 to allow for the location provider API 206 to return prior location estimates instead of new, current location estimates when the prior location estimates meet accuracy requirements of the different requesters 204. The request manager 202 can also record when one or more of the requesters 204 initiate a current location request through the location provider API 206, which requires the location provider to utilize device resources to estimate the devices location and store this information in a request database 210. The request database 210 can then be accessed by an administrator 212 of the wireless service provider or an application associated with the particular one of the requesters 204 that caused the current location request to allow the administrator 212 to adjust the location freshness configuration 208 to appropriately balance the protection of device resources with the accuracy needed by the requesters 204.

As a specific example, the requester 204-1 can request a location estimate of the device when the device's location is needed for the requester to perform a function. For example, in the case of a data collection application, the requester 204 can request a location estimate when a data collection event occurs (e.g., an event that triggers data that the requester 204-1 is responsible for collecting to be recorded).

In response to the location request from the requester 204-1, the request manager 202 can transmit one or more requests to the location provider API 206 in accordance with the location freshness configuration 208. For example, the request manager 202 can send a prior location request 214 to the location provider API that requests a cached location previously determined by the location provider (e.g., a last cached location). The location provider API 206 can return a prior location estimate 216 that corresponds to the cached location estimate and a time elapsed since the prior location estimate 216 was determined. The request manager 202 can compare the time elapsed since the prior location estimate 216 was determined to the location freshness metrics associated with the requester 204-1 in the location freshness configuration 208. For example, the associated location freshness metric can include a maximum allowable time since the prior location estimate 216 was determined (e.g., 15 seconds, 30 seconds, one minute, five minutes, an hour, and so on), and the location freshness metric can be compared to the time elapsed since the prior location estimate was determined.

When the prior location estimate 216 satisfies the location freshness metrics associated with the requester 204-1, the request manager 202 can provide the prior location estimate 216 to the requester 204-1 to satisfy the location request of the requester 204-1. For example, the prior location estimate 216 can satisfy the location freshness metrics associated with the requester 204-1 when the time elapsed is less than the maximum allowable time. In this case, device resources can be saved by leveraging the prior location estimate 216 (e.g., determined in response to a recent request from the requesters 204) instead of using device resources to determine a new location estimate. In the case of a data collection application, satisfying the location request of the requester 204-1 with the prior location estimate 216 can result in the prior location estimate 216 being stored in association with the data collected by the requester 204-1 in response to the data collection event that triggered the location estimation request.

When the prior location estimate 216 does not satisfy the location freshness metrics associated with the requester 204-1, the request manager 202 can transmit a current location request 218 to the location provider API 206. The location provider API 206 can then cause the location provider to determine a new estimate of the current location, using device resources to do so, and return the current location estimate 220 to the request manager 202. The request manager 202 can then return the current location estimate 220 to the requester 204-1 to satisfy the location estimation request of the requester 204-1. In the case of a data collection application, satisfying the location request of the requester 204-1 with the current location estimate 220 can result in the current location estimate 220 being stored in association with the data collected by the requester 204-1 in response to the data collection event that triggered the location estimation request.

In some cases, the request manager 202 can record data indicating that the requester 204-1 caused the location provider to determine a new location estimate of the device's current location (e.g., by initiating a location request that resulted in the current location request 218). For example, this data can be stored in the request database 210. The administrator 212 can then analyze the data in the request database 210 to tune the location freshness configuration 208. For example, if the administrator determines that the requester 204-1 is causing more current location requests than needed given the location accuracy requirements of the requester 204-1, then the administrator 212 can adjust the location freshness configuration 208 to increase the tolerance for returning the prior location estimate 216 instead of the current location estimate 220. As a specific example, the administrator 212 can increase the metric associated with the requester 204-1 that specifies the maximum allowable time since the prior location estimate 216 was determined. In response, any additional location requests made by the requester 204-1 will be responded to with the prior location estimate 216 or the current location estimate 220 based on the updated location freshness configuration 208. Alternatively or additionally, the administrator 212 can set a maximum number of requests (e.g., for the current location estimate 220 or a total number of requests including requests for the prior location estimate 216 and current location estimate 220) that can be made by the requester 204-1 within a period of time.

Although discussed as being a two-step process in which the request manager 202 issues the prior location requests 214 followed by the current location request 218 when the request manager 202 determines that the prior location estimate 216 does not satisfy the location freshness configuration 208, in other cases the location provider can determine whether the prior location estimate 216 satisfies the location freshness configuration 208. In response to this determination, the location provider can provide either the prior location estimate 216 (e.g., when the prior location estimate 216 satisfies the location freshness configuration 208) or the current location estimate 220 (e.g., when the prior location estimate 216 does not satisfy the location freshness configuration 208) based on the determination. To enable this determination, the location provider can access a database storing the location freshness configuration 208 directly or the request manager 202 can provide the location freshness configuration 208 (or the relevant metrics from it) to the location provider API 206 with the single location request.

Similarly, although the request manager 202 is disclosed as accessing the location freshness configuration 208, in other cases the requesters 204 can access the location freshness configuration 208 and communicate it (or the relevant metrics) with their initial location estimate request.

The location freshness configuration 208 and the request manager 202 also enable one or more other types of location requests to be transmitted that do not include the prior location request 214. For example, in some instances such as when a requester cannot tolerate inaccuracies in location estimates, it may be appropriate to only request the current location estimate 220. As a specific example, the current location estimate 220 may be desired when a device is operating in a testing mode deployed by field testing agents testing wireless service quality. Thus, one of the requesters 204 can allow for the prior location estimate 216 to satisfy a request in some modes while requiring the current location estimate 220 in other modes. In other cases, any of the requesters 204 can require the current location estimate 220 to satisfy its location requests, regardless of mode. Thus, the location freshness configuration 208 and the request manager 202 can accommodate this type of location request.

The request manager 202 can further accommodate a recurring location request where multiple location updates are provided to the requester over time in response to a single request. For example, the requester 204-3 can issue a request to receive location updates when criteria are satisfied. The location updates can be received even when location freshness metrics specified in the requester 204-3 are operating in the background (e.g., without issuing new location requests) or even when the requester 204-3 has been killed by the device. In response to the request from the requester 204-3, the request manager 202 can issue a recurring location request 222 to the location provider API 206 that includes a request to provide a location update 224 to the requester 204-2 (e.g., through the request manager 202) when criteria are satisfied.

The criteria can be specified in the location freshness configuration 208. For example, the location freshness configuration 208 can include location freshness metrics associated with the requester 204-3 that specify what criteria must be met to return the location update 224 to the requester 204-3. For example, the location freshness metrics can include a location frequency metric that provides a minimum time difference between consecutive location updates 224 or a location distance metric that provides the minimum difference in distance between consecutive location updates 224.

The request manager 202 can communicate the location freshness metrics with the recurring location request 222. In doing so, the location provider can determine when to determine new location estimates and when to provide those estimates, as the location updates 224, to the requester 204-3 (e.g., through the request manager 202). For example, the location provider can provide the location update 224 to the request manager when the location freshness metrics are satisfied (e.g., when a time since the determination of the last location estimate is greater than the location frequency metric and when the distance between a current location and the last location estimate is greater than the location distance metric). By receiving these metrics in advance with the recurring location request 222, the location provider can optimize new location determinations to satisfy the outstanding requests according to the metrics using fewer device resources.

Like with the current location estimate 220, the request manager 202 can record, in the request database 210, each time the location update 224 is returned. This data can allow the administrator 212 to determine if the location freshness configuration 208 should be tuned to allow for more frequent or less frequent location updates 224.

Figure 3:
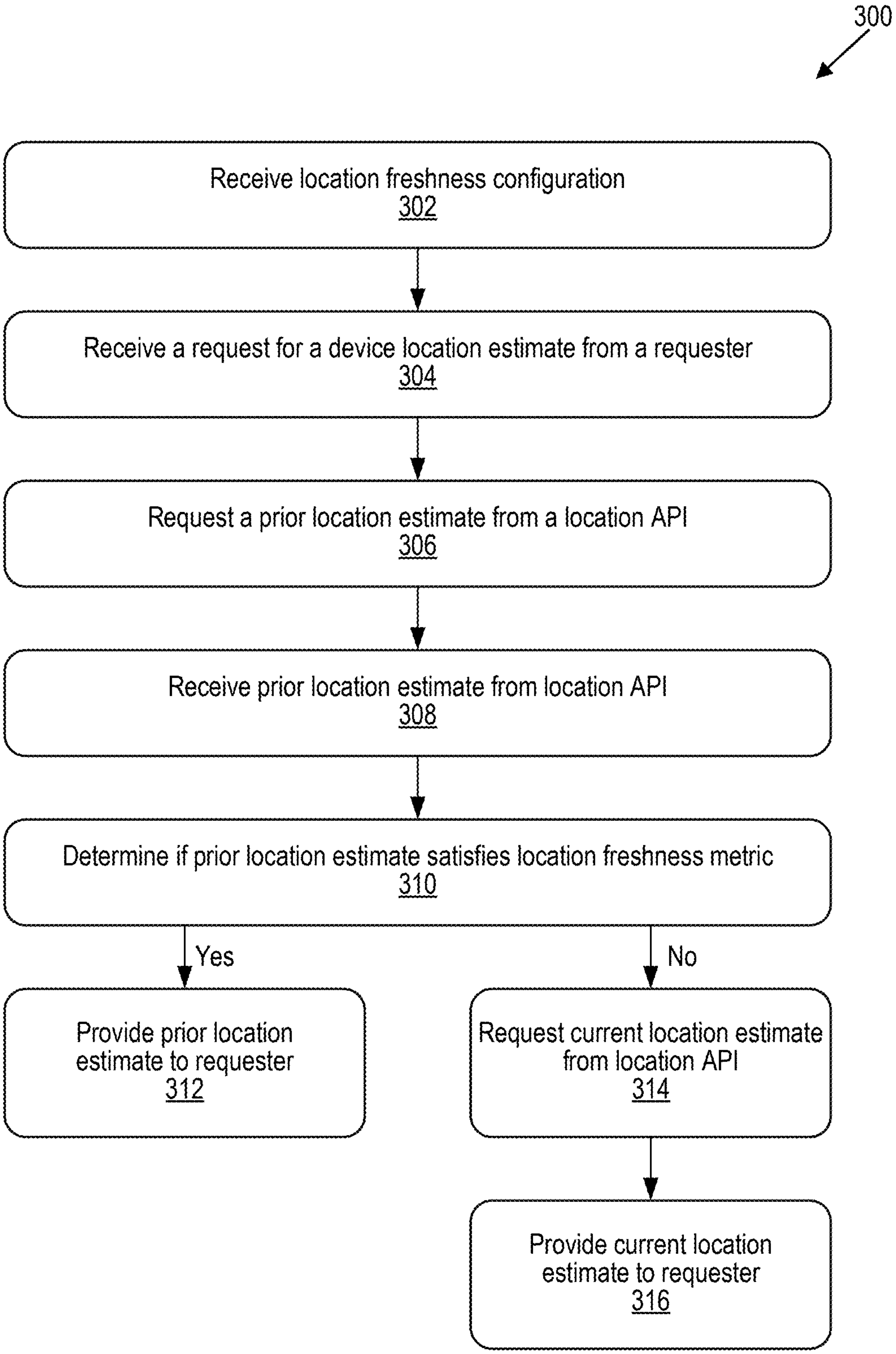
FIG. 3 illustrates a method for requesting location estimates in accordance with aspects of the present technology.

FIG. 3 illustrates a method 300 for requesting location estimates in accordance with aspects of the present technology. Although illustrated in a particular configuration, one or more operations of the method 300 may be omitted, repeated, or reorganized. Additionally, the method 300 may include other operations not illustrated in FIG. 3, for example, operations detailed in one or more other methods described herein. In some implementations, one or more of the operations described in method 300 are performed by a request manager (e.g., request manager 202 of FIG. 2).

At 302, a location freshness configuration is determined. The location freshness configuration includes one or more location freshness metrics associated with one or more location requesters (e.g., an application or portion of an application) operating on a computing device. Each location freshness metric specifies how recently a location estimate must have been determined to satisfy a location request from a particular requester.

At 304, a request for a location estimate of a device is received from a requester. The requester can request the location estimate in response to a triggering event in which the requester needs the location of the device to provide a functionality.

At 306, a request is transmitted to a location API responsible for estimating the device's location. This request asks for a prior location estimate of the UE, which can be provided by the location API without determining a new, current location estimate. In doing so, the location provider can utilize existing location data to conserve device resources and avoid the energy-intensive process of calculating a new location estimate.

At 308, the prior location estimate of the computing device and the elapsed time since this estimate was calculated is received. The elapsed time can be used to determined whether the prior location estimate meets the required freshness criteria specified in the location freshness metric.

At 310, it is determined whether the prior location estimate satisfies the location freshness metric. The determination can be made by comparing the elapsed time since the determination of the prior location estimate to the location freshness metric associated with the requester to determine if the prior location estimate was calculated with sufficient recency.

If the elapsed time does not exceed the freshness metric, the prior location estimate is deemed sufficiently recent to satisfy the location request. In this case, the prior location estimate is returned to the requester at 312.

If the elapsed time exceeds the freshness metric, however, the prior location estimate is deemed insufficient to satisfy the location request. In this case, a second request is transmitted to the location API to obtain a current location estimate of the computing device at 314.

At 316, and in response to transmitting the second request for the current location estimate of the computing device, the current location estimate of the computing device is received from the location API. The current location estimate can then be provided to the requester to satisfy the requester's location request. In doing so, the strain on device resources can be minimized while still providing location estimates with sufficient accuracy to the requester.

Figure 4:
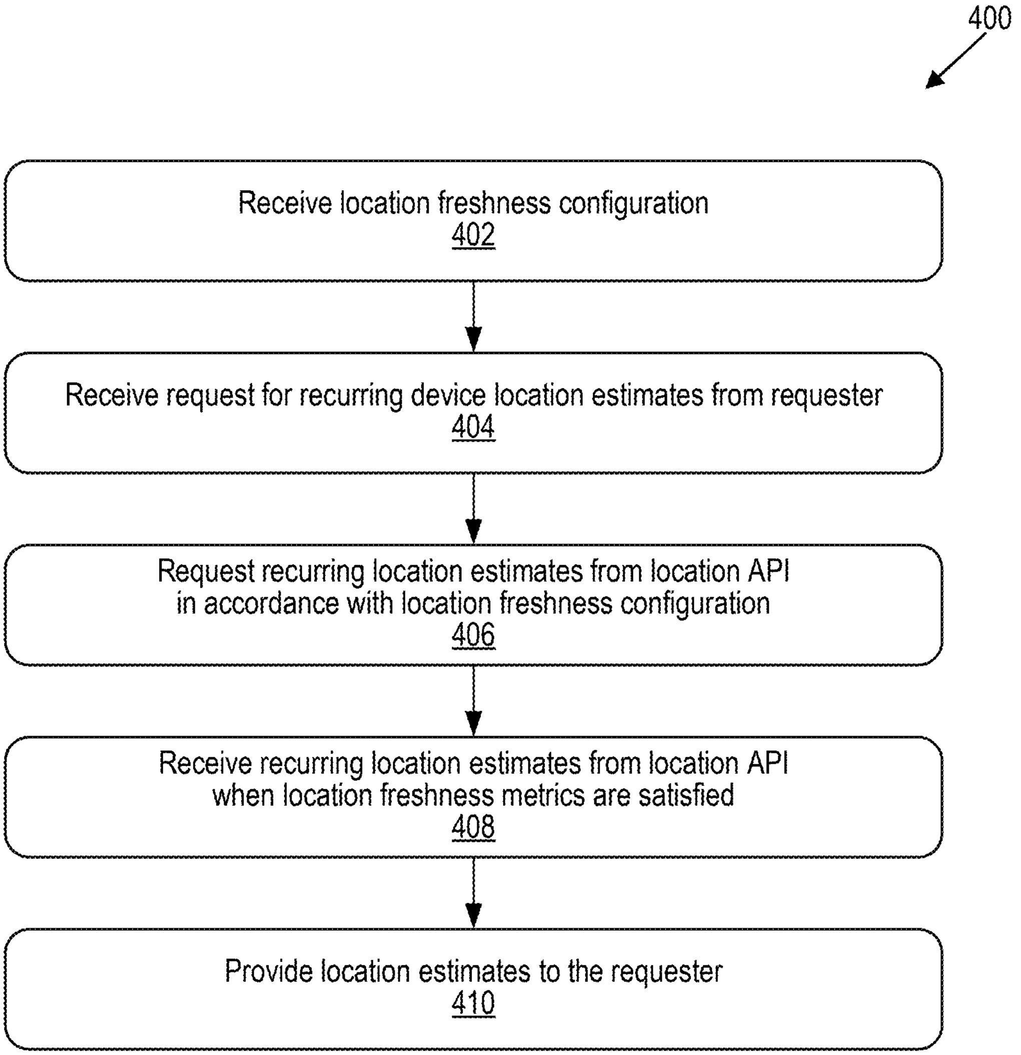
FIG. 4 illustrates a method for requesting recurring location updates in accordance with aspects of the present technology.

FIG. 4 illustrates a method 400 for requesting recurring location updates in accordance with aspects of the present technology. Although illustrated in a particular configuration, one or more operations of the method 400 may be omitted, repeated, or reorganized. Additionally, the method 400 may include other operations not illustrated in FIG. 4, for example, operations detailed in one or more other methods described herein. In some implementations, one or more of the operations described in method 400 are performed by a request manager (e.g., request manager 202 of FIG. 2).

At 402, a location freshness configuration is received. The location freshness configuration specifies location freshness metrics associated with a location estimation requester operating on a computing device. The location freshness metrics specify a frequency at which the location estimation requester is to receive location updates from a location provider. For example, the location freshness metrics include a location frequency metric, which specifies the minimum time interval that must elapse between consecutive location estimates provided to the location estimation requester. The location freshness metrics additionally or alternatively include a location distance metric, which specifies the minimum difference in distance required between consecutive location estimates provided to the location estimation requester.

At 404, a request for recurring location estimates of a device is received from a requester. The recurring location estimates can be received over a period of time without additional location requests. In aspects, the recurring location estimates can be received while the requester is operating in the background of the computing device.

At 406, and in response to the location estimation request from the requester, recurring location estimates are requested from a location API responsible for estimating the location of the computing device. These recurring estimates can be requested in such a way that each set of consecutive location estimates adheres to the location freshness metrics (e.g., the location frequency metric and the location distance metric).

At 408, the request management module receives the recurring location estimates from the location API over a time interval. Each set of consecutive location estimates is received in accordance with the location freshness metrics, ensuring that the location updates are not determined too frequently or too infrequently. In this way, the location estimations can be optimized to use less device resources while providing sufficient location updates with sufficient frequency to the requester.

At 410, and in response to receiving each of the recurring location estimates, the estimates are provided to the requester to satisfy the recurring location request until there is the need for a subsequent location estimation.

Computing System

Figure 5:
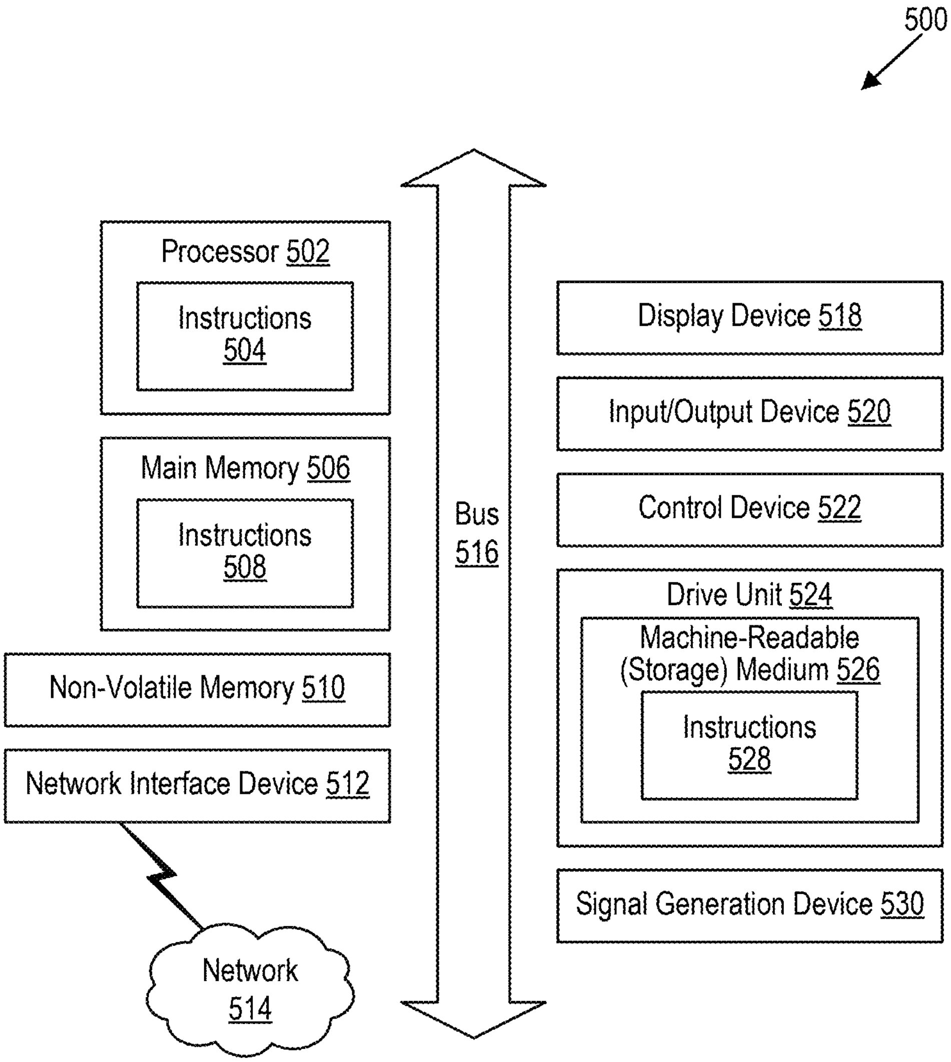
FIG. 5 illustrates components of a computing device that can implement aspects of the present technology.

FIG. 5 is a block diagram that illustrates an example of a computing system 500 in which at least some operations described herein can be implemented. As shown, the computing system 500 can include one or more processors 502, main memory 506, non-volatile memory 510, a network interface device 512, a display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specifies action(s) to be taken by the computing system 500. In some implementations, the computing system 500 can be an embedded computing system, a system-on-chip (SOC), a single-board computing (SBC) system, or a distributed system such as a mesh of computing systems, or it can include one or more cloud components in one or more networks. Where appropriate, one or more computing systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable (storage) medium 526) can be local, remote, or distributed. Although shown as a single medium, the machine-readable (storage) medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable (storage) medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method comprising:

determining, based on a location freshness configuration, a first location freshness metric for a first data collection event of a background data collection application operating on a user equipment (UE), wherein the first location freshness metric includes a required recency of a location estimate of the UE stored in association with the first data collection event after reception by the background data collection application;

transmitting, from the background data collection application to a location application programming interface (API) responsible for estimating a location of the UE, a first request to provide a prior location estimate of the UE to the background data collection application, wherein the prior location estimate can be returned by the location API without determining a current location estimate of the UE;

in response to transmitting the first request, receiving, at the background data collection application, the prior location estimate of the UE and a first elapsed time since the prior location estimate was calculated;

determining that the prior location estimate does not satisfy the first location freshness metric based on comparing the first elapsed time to the first location freshness metric;

in response to determining that the prior location estimate does not satisfy the first location freshness metric, transmitting, from the background data collection application to the location API, a second request to provide the current location estimate of the UE to the background data collection application;

in response to transmitting the second request, receiving, at the background data collection application, the current location estimate of the UE; and storing, by the background data collection application, the current location estimate of the UE in association with the first data collection event.

2. The method of claim 1, further comprising: in response to transmitting the second request, storing data indicating that the background data collection application requested the current location estimate.

3. The method of claim 1, further comprising: in response to transmitting the second request, storing data indicating that the first data collection event caused the background data collection application to request the current location estimate.

4. The method of claim 1, further comprising:

determining, based on the location freshness configuration, a second location freshness metric for the first data collection event, wherein the second location freshness metric replaced the first location freshness metric in the location freshness configuration, wherein the second location freshness metric includes a required recency of a subsequent location estimate of the UE stored in association with an additional occurrence of the first data collection event after reception by the background data collection application; and determining whether a subsequent prior location estimate of the UE is to be stored in association with the additional occurrence of the first data collection event based on whether the subsequent prior location estimate of the UE satisfies the second location freshness metric.

5. The method of claim 1, further comprising:

determining, based on the location freshness configuration, a second location freshness metric for a second data collection event of the background data collection application, wherein the second location freshness metric includes a required recency of a location estimate of the UE stored in association with the second data collection event after reception by the background data collection application;

transmitting, from the background data collection application to the location API, a third request to provide the prior location estimate of the UE to the background data collection application; and determining whether the prior location estimate of the UE is to be stored in association with the second data collection event based on whether the prior location estimate of the UE satisfies the second location freshness metric.

6. The method of claim 1, wherein the first data collection event comprises a battery data collection event, a network coverage data collection event, a voice call quality data collection event, a latency data collection event, or an app launch data collection event.

7. The method of claim 1, wherein the location API comprises a fused location API that communicates the location of the UE that is based on a combination of different location estimation systems.

8. A system comprising:

at least one hardware processor;

at least one non-transitory memory storing instructions that, when executed by the at least one hardware processor, cause the system to:

receive, at a request management module, a location freshness configuration specifying, for each of one or more location estimation requesters of a computing device, a location freshness metric associated with the location estimation requester, wherein the location freshness metric specifies how recent a location estimate of the computing device needs to be to fulfill a location estimation request of the location estimation requester; and in response to a particular location estimation request from a particular location estimation requester of the one or more location estimation requesters:

request, by the request management module and from a location application programming interface (API) responsible for estimating a location of the computing device, a prior location estimate of the computing device;

receive the prior location estimate of the computing device and a time elapsed since a determination of the prior location estimate;

in response to determining that the time elapsed since the determination of the prior location estimate satisfies a particular location freshness metric associated with the particular location estimation requester, provide the prior location estimate to the particular location estimation requester; and in response to determining that the time elapsed since the determination of the prior location estimate does not satisfy the particular location freshness metric:

request, by the request management module and from the location API, a current location estimate of the computing device;

receive the current location estimate; and provide the current location estimate to the particular location estimation requester.

9. The system of claim 8, further comprising: in response to requesting the current location estimate of the computing device, storing data indicating that the particular location estimation requester initiated a determination of the current location estimate.

10. The system of claim 8, wherein the system is further caused to:

determine that the particular location estimation requester is in a testing mode in which the particular location estimation requester requires estimates of a current location estimate of the computing device regardless of the location freshness metric; and in response to an additional location estimation request from the particular location estimation requester, request, by the request management module and from the location API, an additional current location estimate of the computing device without first requesting an additional prior location estimate of the computing device.

11. The system of claim 8, wherein the system is further caused to:

determine that the location freshness configuration has been changed to alter the particular location freshness metric; and determine whether a subsequent prior location estimate of the computing device is to be provided to the particular location estimation requester based on whether the subsequent prior location estimate satisfies the altered particular location freshness metric.

12. The system of claim 8, wherein the particular location estimation requester comprises a battery data collection system, a network coverage data collection system, a voice call quality data collection system, a latency data collection system, or an app launch data collection system.

13. The system of claim 8, wherein the location API comprises a fused location API that communicates the location of the computing device that is based on a combination of different location estimation systems.

14. The system of claim 8, wherein the one or more location estimation requesters are elements of a background data collection application.

15. The system of claim 8, wherein the one or more location estimation requesters include one or more first location requesters that are elements of a first application operating on the computing device and one or more second location requesters that are elements of a second application operating on the computing device.

16. At least one non-transitory, computer-readable storage medium storing instructions, which, when executed by at least one data processor of a system, cause the system to:

receive, at a request management module, a location freshness configuration specifying location freshness metrics associated with a location estimation requester operating on a computing device, wherein the location freshness metrics include:

a location frequency metric that specifies a minimum time interval between consecutive location estimates provided to the location estimation requester; and a location distance metric that specifies a minimum difference in distance required between the consecutive location estimates provided to the location estimation requester; and in response to a location estimation request from the location estimation requester:

request, by the request management module and from a location application programming interface (API) responsible for estimating a location of the computing device, recurring location estimates where each set of consecutive location estimates is received in accordance with the location frequency metric and the location distance metric;

receive, over a time interval, the recurring location estimates where each set of consecutive location estimates is received in accordance with the location frequency metric and the location distance metric; and in response to receiving each of the recurring location estimates, provide each of the recurring location estimates to the location estimation requester.

17. The at least one non-transitory, computer-readable storage medium of claim 16, wherein the instructions further cause the system to, in response to receiving each of the recurring location estimates, store data indicating that the location estimation requester received a current location estimate.

18. The at least one non-transitory, computer-readable storage medium of claim 16, wherein the instructions further cause the system to:

receive a change to the location freshness configuration that alters one or more of the location freshness metrics; and in response to a subsequent location estimation request from the location estimation requester, request, by the request management module and from a location API, subsequent recurring location estimates where each set of subsequent consecutive location estimates is received in accordance with the altered location freshness metrics.

19. The at least one non-transitory, computer-readable storage medium of claim 16, wherein the location estimation requester is an element of a background data collection application.

20. The at least one non-transitory, computer-readable storage medium of claim 16, wherein the location API comprises a fused location API that communicates the location of the computing device that is based on a combination of different location estimation systems.

* * * * *